(12) United States Patent
Burns et al.

(10) Patent No.: US 8,220,134 B2
(45) Date of Patent: Jul. 17, 2012

(54) FLEXIBLE FASTENING MACHINE TOOL

(75) Inventors: Thomas E. Burns, Williamsville, NY (US); Gary Riehle, West Falls, NY (US); Eugene T. Darlak, North Tonawanda, NY (US); Steven J. Matheis, Arcade, NY (US)

(73) Assignee: Gemcor II, LLC, West Seneca, NY (US)

( * ) Notice: Subject to any disclaimer, the term of this patent is extended or adjusted under 35 U.S.C. 154(b) by 523 days.

(21) Appl. No.: 12/483,752

(22) Filed: Jun. 12, 2009

(65) Prior Publication Data

US 2010/0011563 A1 Jan. 21, 2010

Related U.S. Application Data

(60) Provisional application No. 61/060,949, filed on Jun. 12, 2008.

(51) Int. Cl.
*B23Q 7/00* (2006.01)
*B23C 1/00* (2006.01)
*B21J 15/10* (2006.01)

(52) U.S. Cl. .............................. 29/559; 29/56.6; 227/51

(58) Field of Classification Search ............... 29/525.01, 29/56.5, 56.6, 257, 281.1, 281.4, 34 B, 559; 227/51, 55, 107, 111, 119, 140, 143, 148, 227/154
See application file for complete search history.

(56) References Cited

U.S. PATENT DOCUMENTS

| 4,821,408 A | 4/1989 | Speller, Sr. et al. |
| 4,864,702 A | 9/1989 | Speller, Sr. et al. |
| 4,864,713 A | 9/1989 | Roberts et al. |
| 4,966,323 A | 10/1990 | Speller, Sr. et al. |
| 4,998,943 A | 3/1991 | Roberts et al. |
| 5,027,490 A | 7/1991 | Roberts et al. |
| 5,060,362 A | 10/1991 | Birke et al. |
| 5,154,643 A | 10/1992 | Catania et al. |
| 5,220,718 A | 6/1993 | Speller, Sr. et al. |
| 5,222,289 A | 6/1993 | Michalewski et al. |
| 5,248,074 A | 9/1993 | Speller, Sr. et al. |
| 5,329,691 A | 7/1994 | Roberts et al. |
| 5,357,668 A | 10/1994 | Roberts |
| 5,477,597 A | 12/1995 | Catania et al. |
| 5,535,498 A | 7/1996 | Roberts et al. |
| 5,555,616 A | 9/1996 | Michalewski et al. |
| 5,604,974 A | 2/1997 | Roberts et al. |
| 5,611,130 A | 3/1997 | Rummell et al. |

(Continued)

*Primary Examiner* — John C Hong

(74) *Attorney, Agent, or Firm* — Hodgson Russ LLP

(57) ABSTRACT

A flexible fastening machine tool having first and second facing pedestals is mounted on first and second pairs of rails. The pedestals are movable along the rails in a Y-axis direction. A rail base is provided and the second pair of rails is mounted on the rail base. A third pair of rails that extend in an X-axis direction are mounted to the floor, and the rail base is positioned on the third pair of rails, such that the second pedestal is movable along the third pair of rails in the X-axis direction toward and away from the first pedestal. A first movable carriage is mounted on the first pedestal and a second movable carriage is mounted on the second pedestal. A frame member is supported by the first and second carriages and the frame member holds a workpiece. The first and second carriages are independently movable toward and away from the first and second pairs of rails such that the fixture frame is capable of being raised, lowered and tilted. A C-frame is mounted on the third pair of rails and the C-frame is capable of performing tooling operations on the workpiece.

20 Claims, 9 Drawing Sheets

U.S. PATENT DOCUMENTS

| | | |
|---|---|---|
| 5,613,395 A | 3/1997 | Zienkiewicz et al. |
| 5,615,474 A | 4/1997 | Kellner et al. |
| 5,621,970 A | 4/1997 | Roberts et al. |
| 5,653,005 A | 8/1997 | Speller, Sr. et al. |
| 5,661,892 A | 9/1997 | Catania et al. |
| 5,687,463 A | 11/1997 | Michalewski et al. |
| 5,778,505 A | 7/1998 | Mangus et al. |
| 2005/0236735 A1* | 10/2005 | Oldani et al. ............. 264/257 |

* cited by examiner

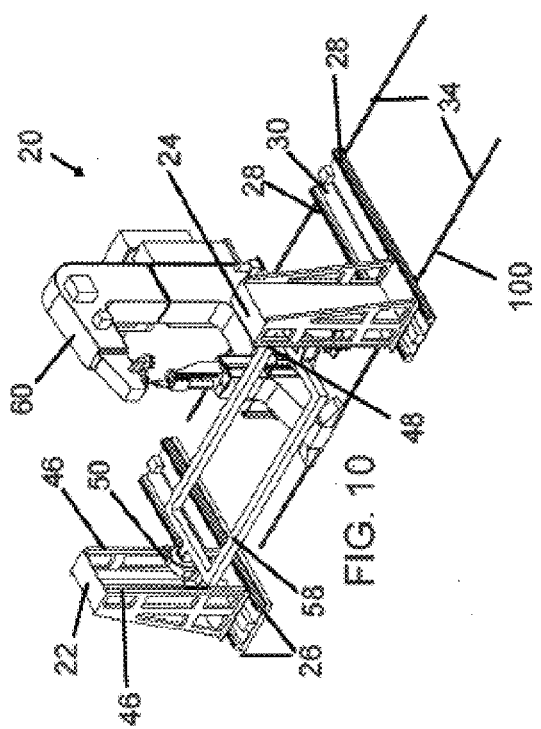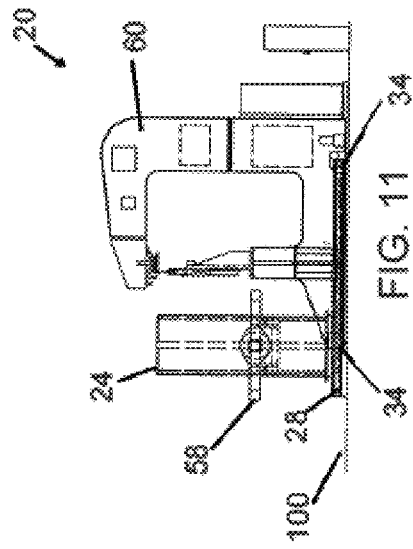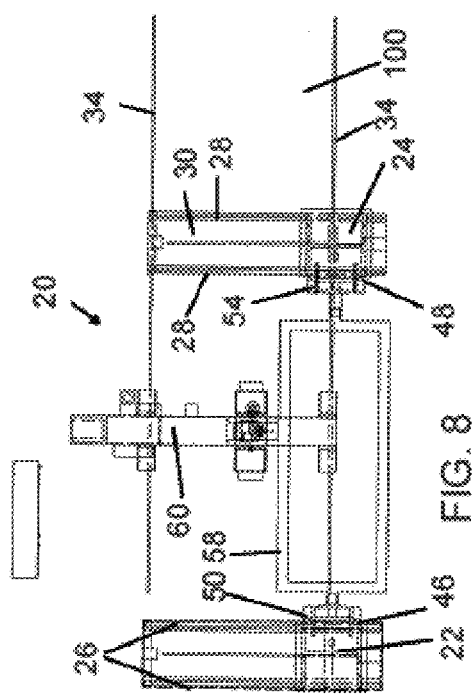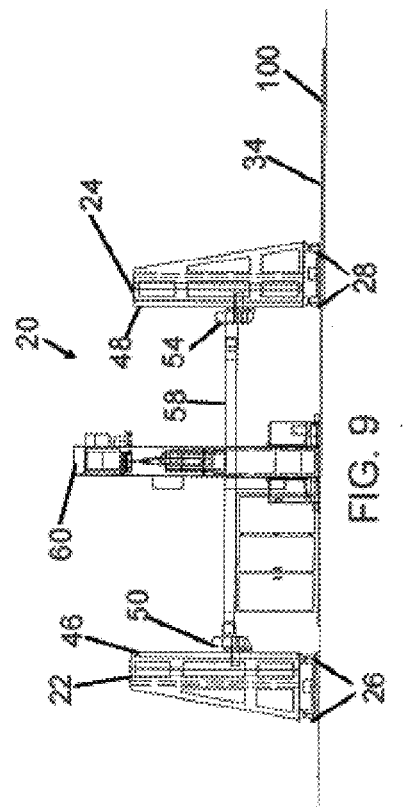

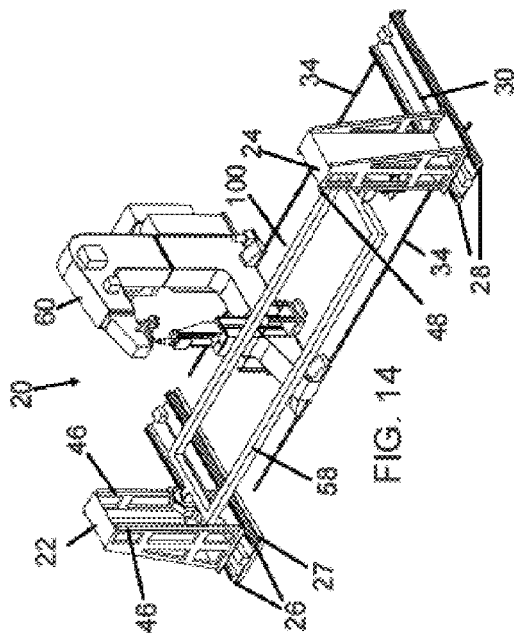
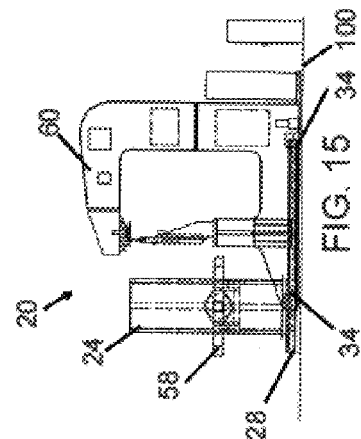
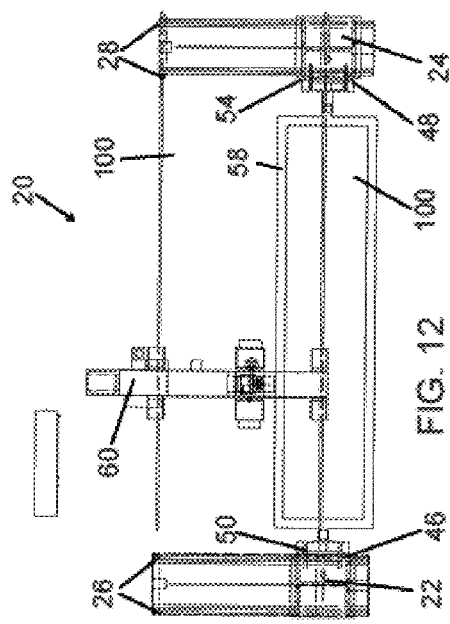
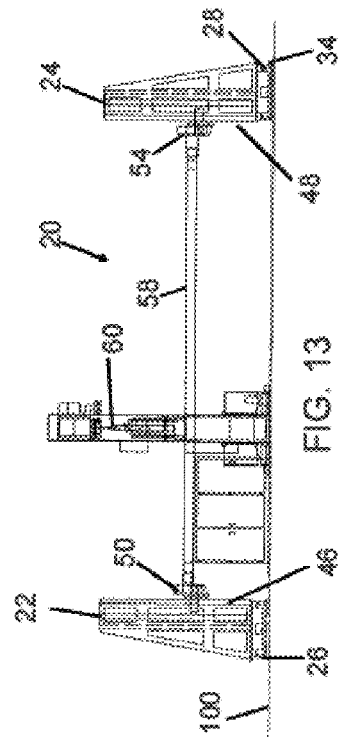

FLEXIBLE FASTENING MACHINE TOOL

CROSS-REFERENCE TO RELATED APPLICATION

The present application claims priority benefit of U.S. Provisional Patent Application No. 61/060,949 entitled "Flexible Fastening Machine Tool" filed on Jun. 12, 2008, which is hereby incorporated by reference.

BACKGROUND

The components of airplanes, for example the wings and fuselage, are presently manufactured on very large tooling machines. These machines are extremely heavy and are housed in very large buildings. In addition, a plurality of machines are required in order to manufacture a single component of the airplane, because most of the machine tools are dedicated to a specific component.

FIG. 1 is a perspective view of a prior art machine tool 8. There are facing pedestals 10 that are fixed to the shop floor 100. Each of the pedestals 10 supports an end of a very large and heavy work frame 11. The work frame 11 may weigh tens of thousands of pounds. There is a fixture 12 attached to the work frame 11, and a workpiece 14 is attached to the fixture 12. A C-frame 15 is provided for performing machining operations on the workpiece 14. For example the C-frame 15 may be used for installing and upsetting fasteners in the workpiece 14. The C-frame 15 is supported on heavy C-frame platforms 17 and X-axis carriage 16 which allows for movement of the C-frame 15 in the Y-axis direction. However, the machine tool 8 has limitations. The pedestals 10 must be enormous in weight and height, as measured from the floor 100, in order to support the massive work frame 11. Indeed, internal to the pedestals 10 are enormous counterweights for offsetting the great weight of the work frame 11. In addition, the shop floor 100 must be made with extremely thick foundations, for example, six or more feet thick, in order to support the massive pedestals 10 and work frame 11 and C-frame 15 with platforms 17 and X-axis carriage 16. All of this adds to the costs associated with using the tall heavy pedestals 10, massive work frame 11, C-frame 15 with platforms 17 and X-axis carriage 16. In addition, the machine tool 8 is limited to the extent that it may only accommodate a dedicated work frame 11 having a fixed length. The workframe was previously sized for the largest workpiece 14 to be produced on the machine. The workpieces 14 may be in various shapes and sizes, from flat (requiring very little A and B axis rotation or angle) to single curve partial cylindrical (requiring only A angle rotation) to double curved (requiring A and B angle rotation as shown in FIG. 2). If a machine is designed with a long work frame 11 (based on the longest workpiece 14) and is used to produce a shorter double curved workpiece 14 with a large B angle requirement (the B angle is the tilting angle made by the work frame 11 relative to horizontal) the pedestals 10 and C-frame 15 must be significantly taller to accommodate the long work frame 11 when a large B angle is required, thereby resulting in an increase in both the height and weight of the machine tool 8. That is, the work frame 11 is of constant size, which means that for different sized and shaped workpieces 14 additional machine tools 8 must be used. As a result, three (3) or more machine tools 8 may be required during the fabrication of a single group of workpieces. This duplication of differently sized machine tools 8 undesirably adds to costs, increases the possibility of down time, increases maintenance costs, and may result in production inefficiencies.

Thus, what is needed is a better way to assembly the components of a workpiece, for example aircraft wing, that eliminates the need for multiple machine tools, deceases costs, and provides for a lighter weight apparatus having greater flexibility.

SUMMARY OF THE INVENTION

The present flexible fastening machine tool comprises first and second facing pedestals mounted on first and second pairs of rails. The first pair of rails is mounted to the floor. The pedestals are movable along the first and second pairs of rails in the Y-axis direction. The second pair of rails is mounted on a rail base, and the second pair of rails extend from the rail base. A third pair of rails is mounted on the floor, and the third pair of rails extend in the X-axis direction. The rail base supporting the second pair of rails is positioned on the third pair of rails, such that the second pedestal is capable of being moved along the third pair of rails in the X-axis direction toward and away from the first pedestal, in addition to being movable in the Y-axis direction. A first movable carriage mounted on the first pedestal and a second carriage mounted on the second pedestal, and a fixture frame, also referred to herein as a frame member, is supported by the first and second carriages. The fixture frame supports a workpiece. The first and second carriages are independently movable toward and away from the first and second pairs of rails such that the frame member is capable of being raised, lowered and tilted. A C-frame is mounted on the third pair of rails, and the C-frame is for performing tooling operations on the workpiece. The flexible fastening machine tool is capable of accommodating differently sized fixture frames, such that a plurality of workpieces may be machined by the same machine tool. Thus, the need for a plurality of machine tools is advantageously eliminated.

BRIEF DESCRIPTION OF THE DRAWING FIGURES

FIG. 8 is a top plan view of the flexible fastening machine tool.

FIG. 9 is a front elevational view of the flexible fastening machine tool.

FIG. 10 is a right perspective view of the flexible fastening machine tool.

FIG. 11 is a right end elevational view of the flexible fastening machine tool.

FIGS. 12-15 are substantially the same as FIGS. 8-11, with the difference being the frame member has a greater length in FIGS. 12-15.

DETAILED DESCRIPTION

Figure 2:
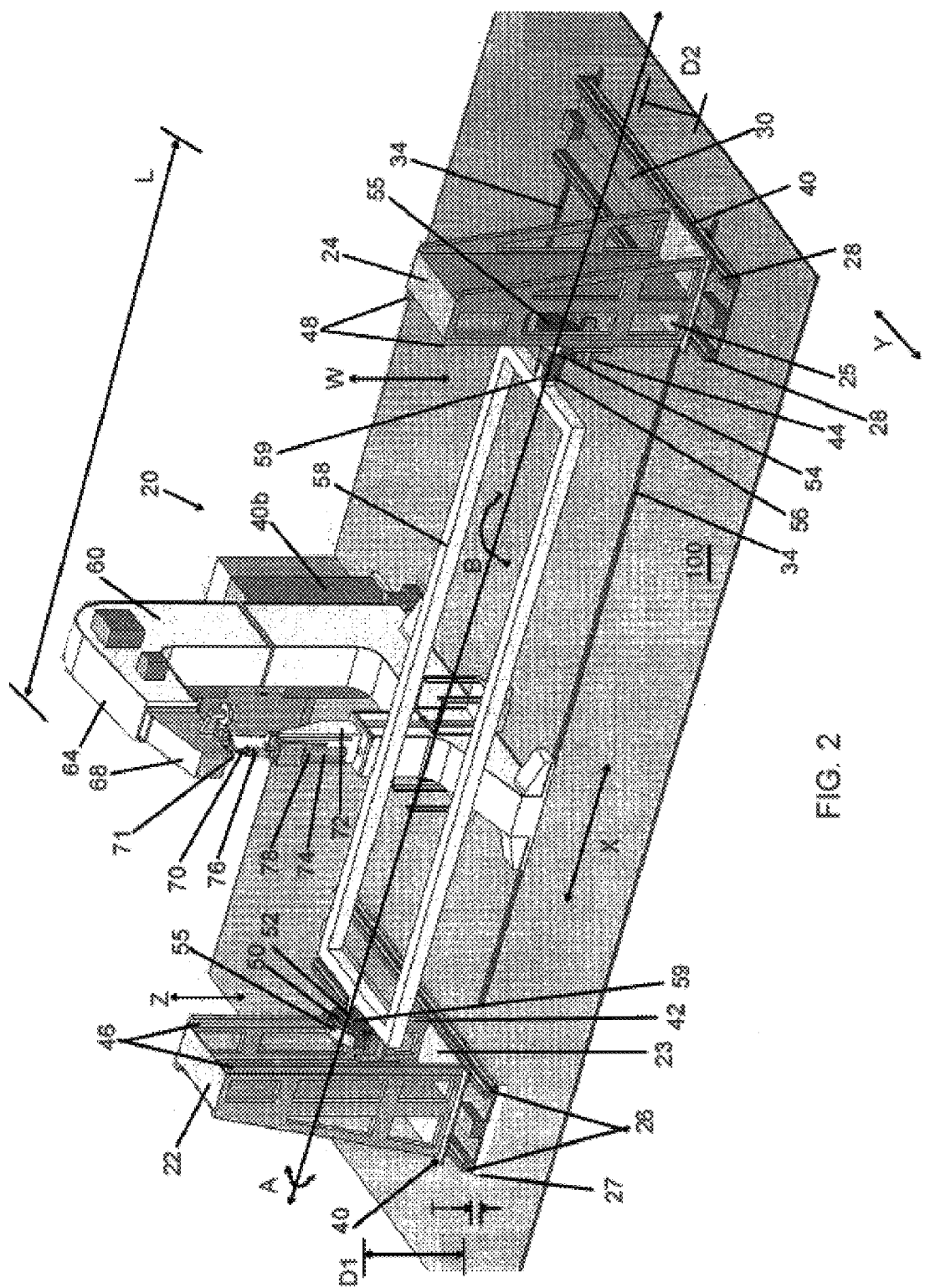
FIG. 2 is a perspective view of the flexible fastening machine tool.

The present invention is a flexible fastening machine tool 20, as shown in FIGS. 2-15. The flexible fastening machine tool 20 as shown in FIG. 2 comprises first and second pedestals 22, 24, respectively, that face one another. The first pedestal 22 has a first base member 23, and the first base member 23 of the first pedestal 22 is movably positioned on a first pair of rails 26 (also referred to herein as guides 26). The first pair of rails 26 are positioned on a platform 27 and are connected to the platform 27. The platform 27 is supported on the floor or ground 100 of, for example, a factory, and the platform 27 is connected to the floor 100. The second pedestal 24 has a second base member 25, and the second base member 25 is movably positioned on a second pair of rails 28. The first and second pairs of rails 26, 28 are substantially parallel to one another. In other preferred embodiments, each of the first and second base members 23, 25, may be movably positioned on a single rail or guide 26, 28.

The first pedestal 22 is movable back and forth in a Y-axis direction along the first pair of rails 26, as shown in FIG. 2. The second pedestal 24 is movable back and forth in the Y-axis direction along the second pair of rails 28. In addition, the second pair of rails 28 is mounted on a movable rail base 30. The flexible fastening machine tool 20 has a third pair of rails 34, and the third pair of rails 34 is connected to the floor 100. The third pair of rails 34 extend in the X-axis direction, as shown in FIG. 2. Thus, the third pair of rails 34 extends in a direction that is substantially perpendicular to the first and second pairs of rails 26, 28. The rail base 30 that supports the second pair of rails 28 is movably positioned on the third pair of rails 34. The rail base 30 has suitable means for engaging on its underside for engaging the third pair of rails 34. For example the underside of the rail base 30 may have grooved channels or bearings for engaging the third pair of rails 34 on which it is positioned. In addition, when the second pair of rails 28 is supported on the third pair of rails 34, the second pair of rails 28 is substantially the same height off the floor 100 as the first pair of rails 26, because the first pair of rails 26 is supported on the platform 27 having a thickness designated T in FIG. 2. The second pedestal 24 is thus movable in both the Y-axis direction on the second pair of rails 28, and is movable and the X-axis direction on the third pair of rails 34. When the second pedestal 24 is moved along the third pair of rails 34 it may be moved toward or away from the first pedestal 22. There are means for moving 40 the first and second pedestals 22, 24. The means for moving 40 may include electric drive units, hydraulic drive units, pneumatic drive units, screw arrangements, and other means for moving. Electric drive units, hydraulic drive units, pneumatic drive units and screw arrangements for causing movement, and the use and control thereof are well known to those having ordinary skill in the art and are therefore not described herein in detail.

The first pedestal 22 supports a first carriage 42, and the second pedestal supports a second carriage 44. The first carriage 42 is mounted on a first pair of pedestal guides or rails 46, and the second carriage 44 is movably mounted on a second pair of pedestal guides or rails 48. The first carriage 42 is movable in the Z-axis direction, as shown in FIG. 2, such that the first carriage 42 is movable in a direction substantially perpendicular to the first and second pairs of rails 26, 28. The second carriage 44 is movable in the W-axis direction, as shown in FIG. 2, such that the second carriage 44 is movable in a direction substantially perpendicular to the first and second pairs of rails 26, 28. It is pointed out that the Z and W axes extend in a direction substantially perpendicular to the X and Y axes.

The first carriage 42 supports a first gear box assembly or slave rotary bearing 50 having a first frame receiving housing 52, and the second carriage 44 supports a second gear box assembly or slave rotary bearing 54 having a second frame receiving housing 56. The first and second frame receiving housings 52, 56 are for receiving and supporting the ends, commonly designated 59, of a frame member 58. As shown in FIG. 2, the first and second gear box assemblies 50, 54 are capable of rotating the frame member 58 about an A-axis, which extends through the first and second gear box assemblies 50, 54, such that the frame member 58 is rotatable about the A-axis relative to the first and second pedestals 22, 24. Each of the first and second gear box assemblies 50, 54 have a means for rotating the frame member 55 which may be an electric or hydraulic motor or other suitable means. Electric and hydraulic motors, their use and operation and control thereof are well known to those having ordinary skill in the art.

Figure 3:
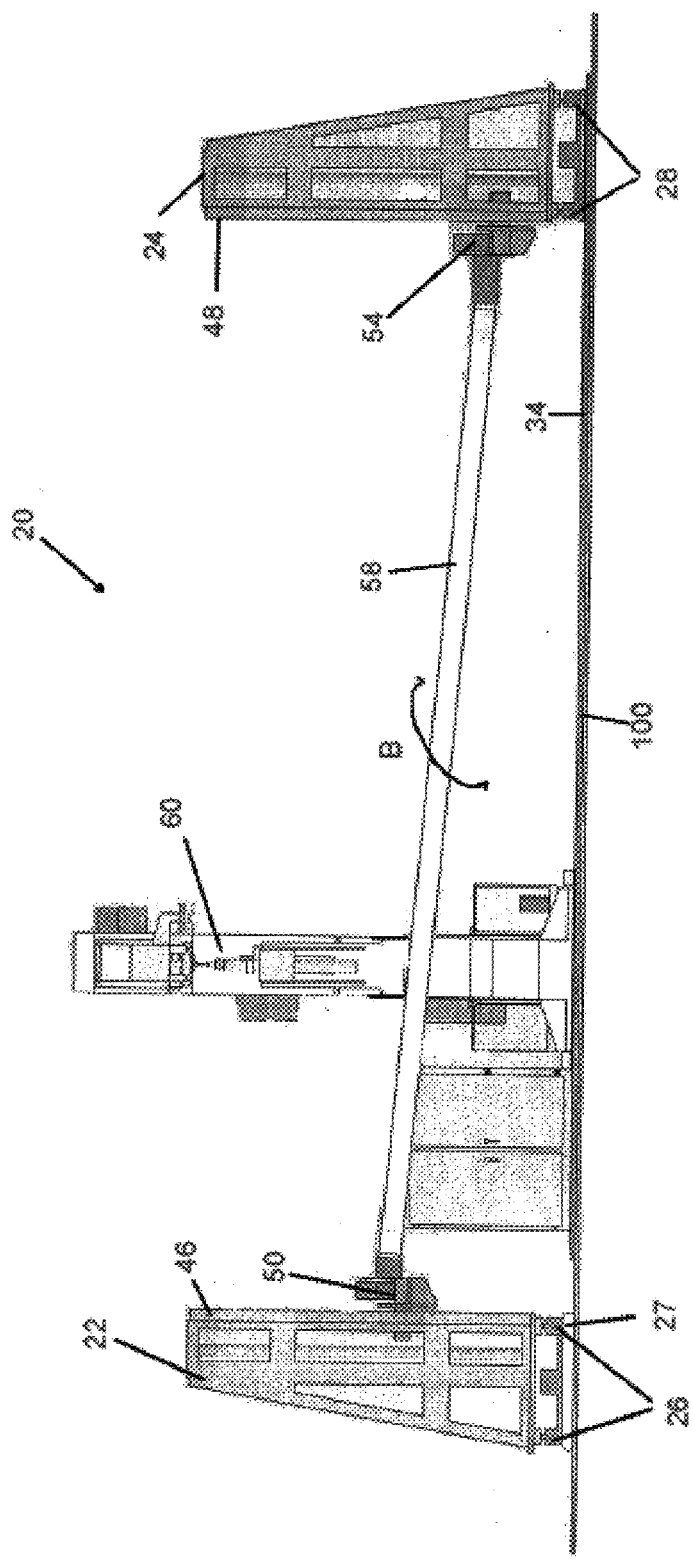
FIG. 3 is a front elevational view of the flexible fastening machine tool wherein the fixture frame is tilted.
Figure 4:
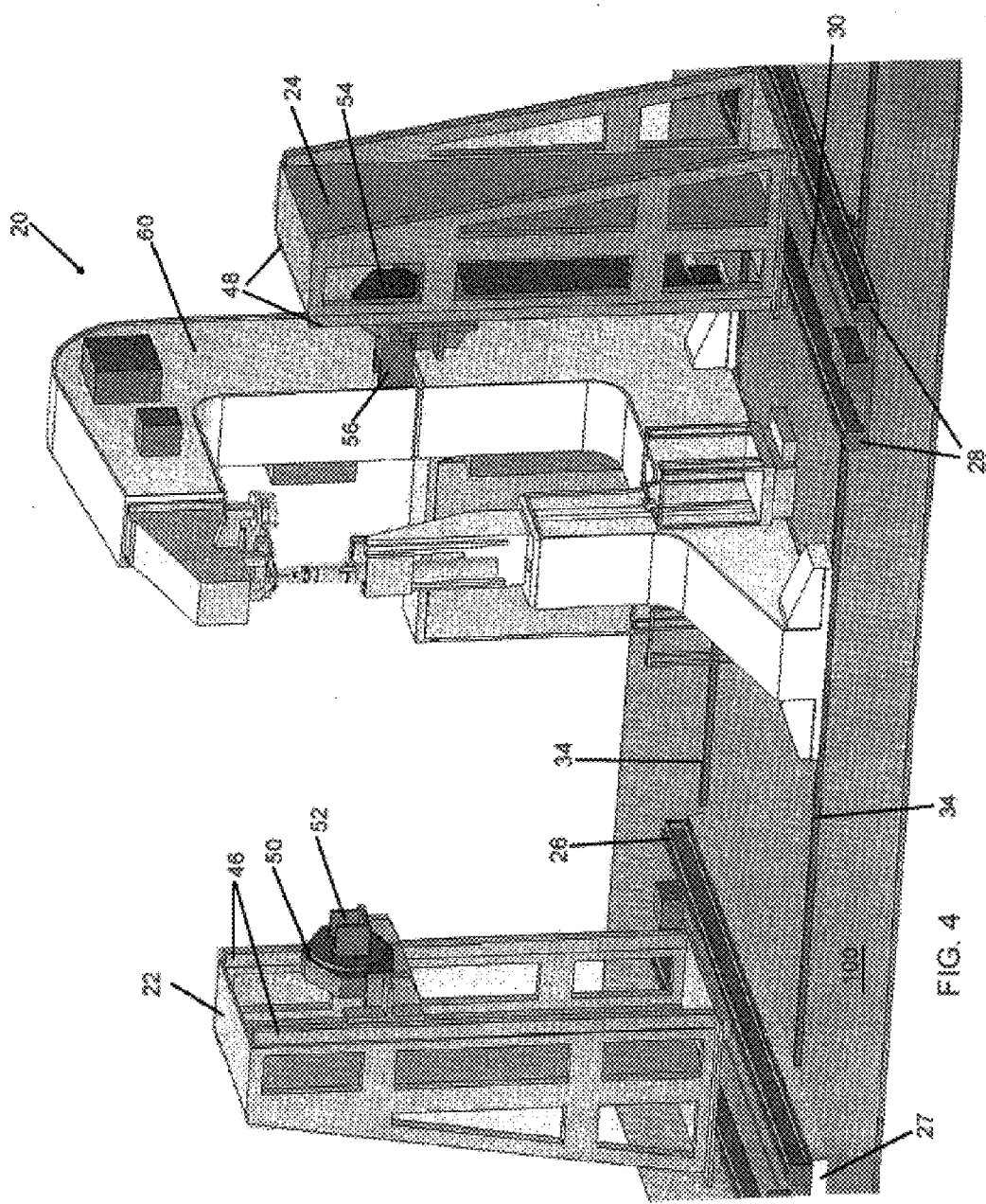
FIG. 4 is an enlarged perspective view of the flexible fastening machine tool wherein the first and second pedestals are moved closer together as compared to FIG. 1, and wherein the fixture frame is absent.
Figure 5:
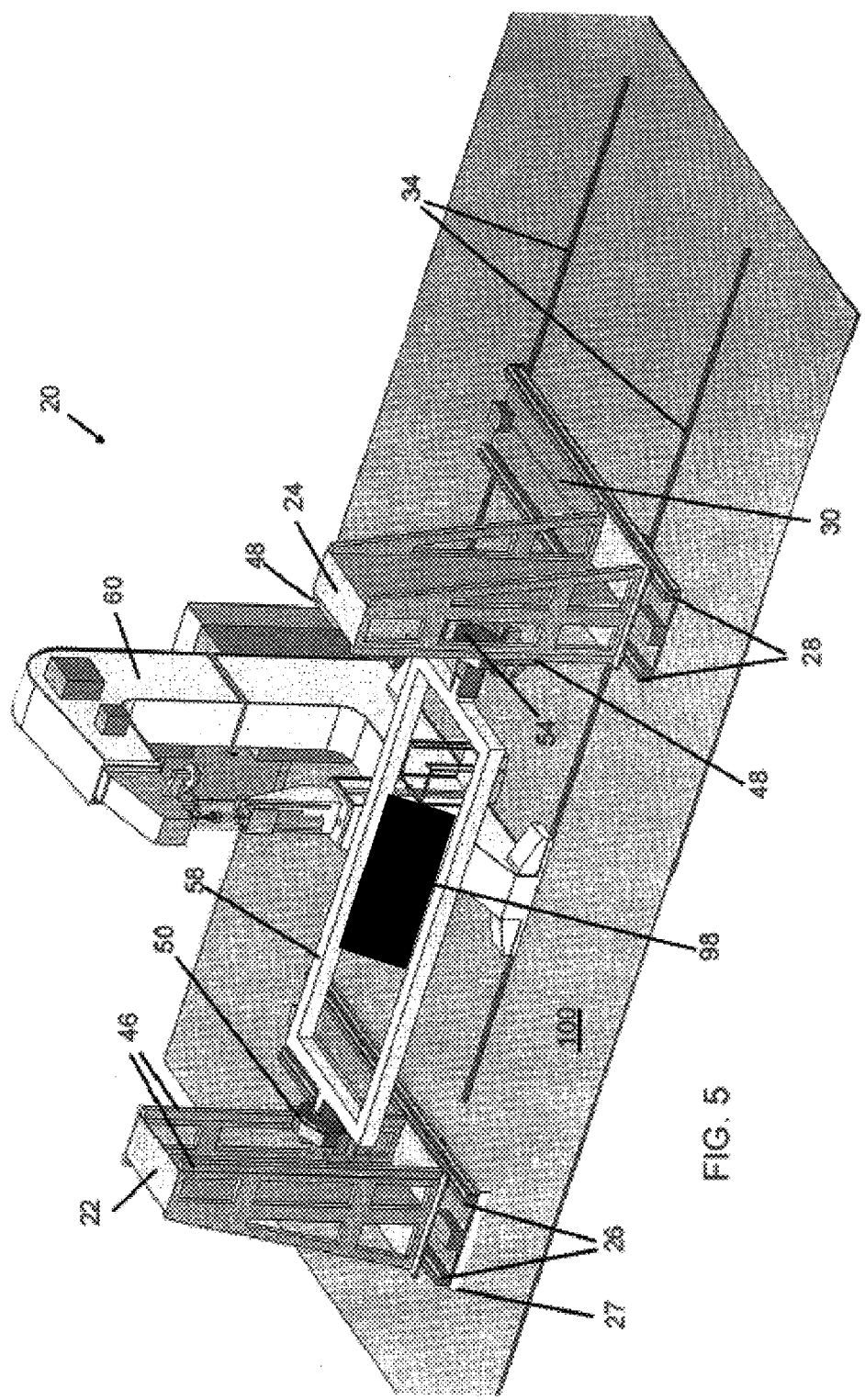
FIG. 5 is an enlarged perspective view of the flexible fastening machine tool wherein the fixture frame is present and is supporting a workpiece.
Figure 6:
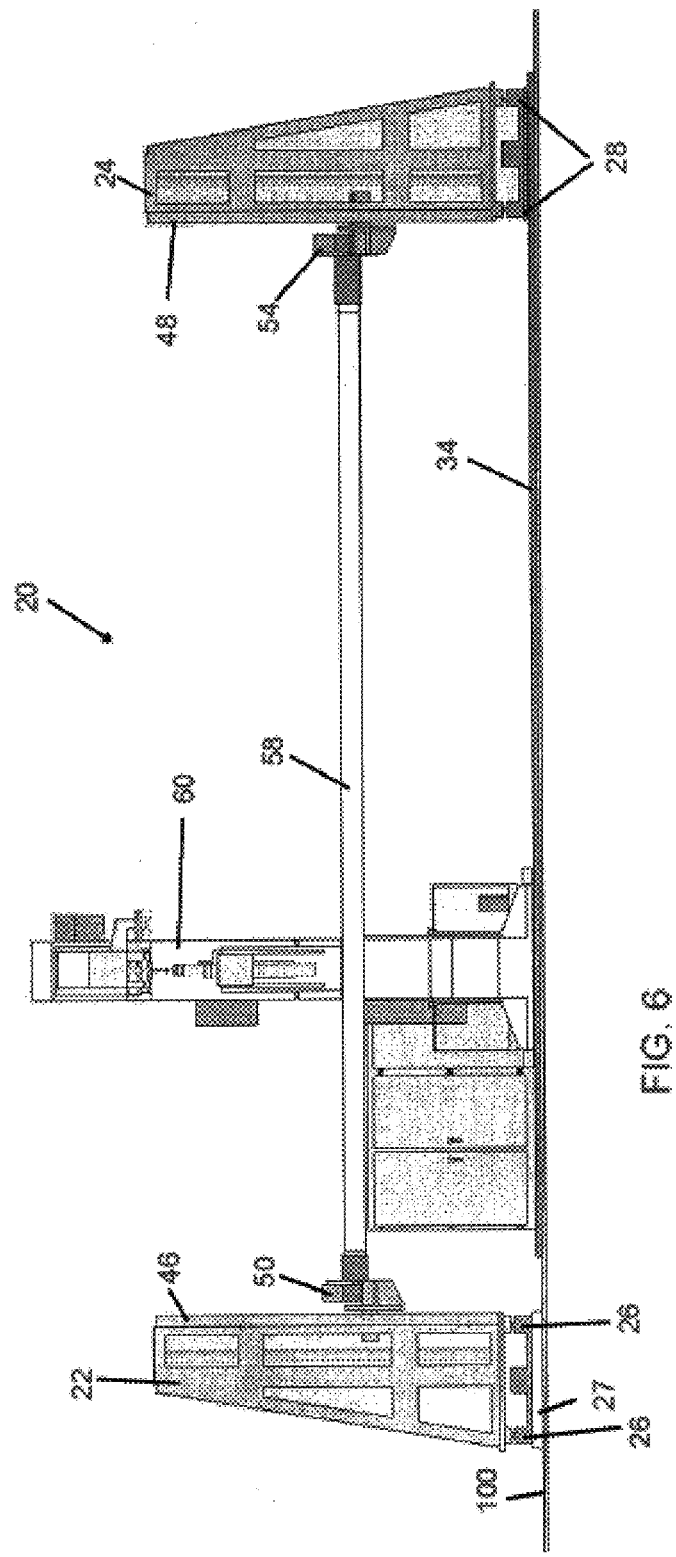
FIG. 6 is a front elevational view of the flexible fastening machine tool wherein the first and second pedestals are spaced from one another to accommodated an elongate fixture frame.
Figure 7:
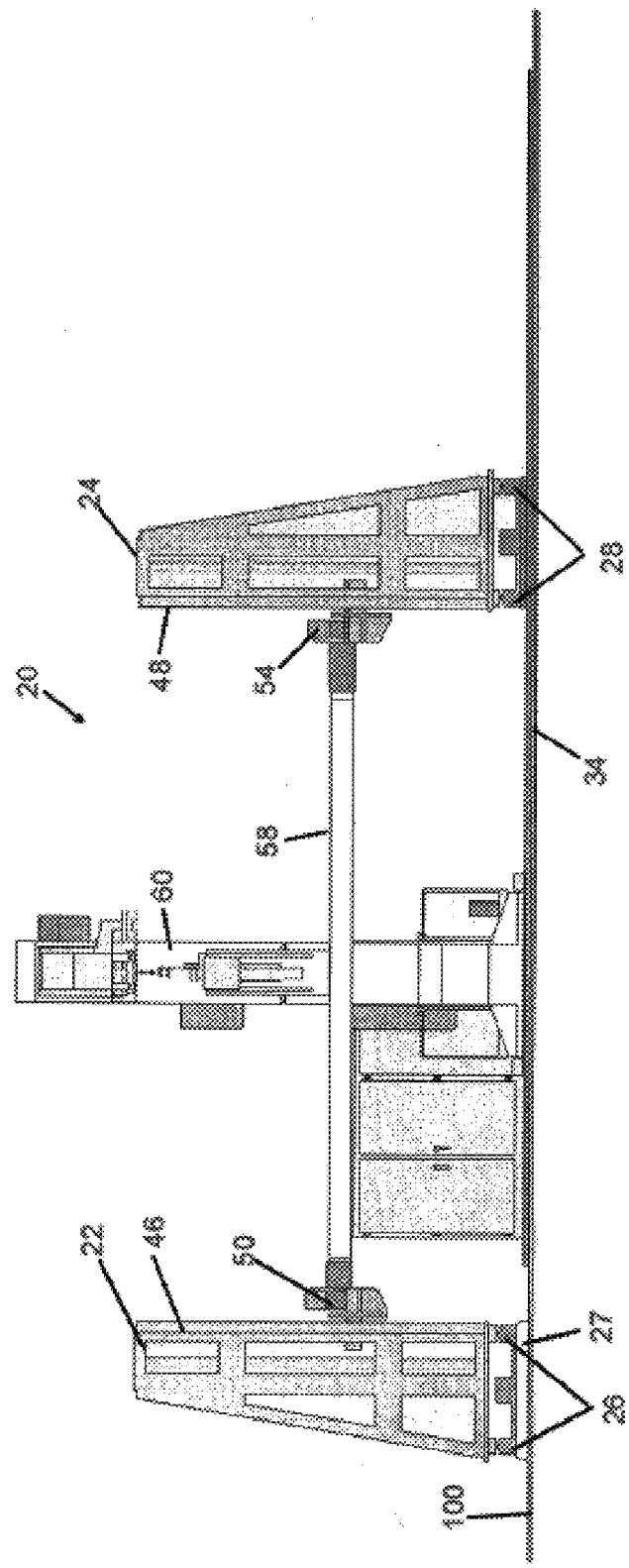
FIG. 7 is a front elevational view of the flexible fastening machine tool wherein the first and second pedestals are spaced closer to one another as compared to FIG. 6, and wherein the fixture frame has a length less that that of the fixture frame of FIG. 6.

In addition, the first carriage 42 is independently movable in the Z-axis direction, and the second carriage 44 is independently movable in the W-axis direction, such that the first and second carriages 42, 44 are independently movable relative to one another. As shown in FIG. 2, the distance D1 from the first carriage 42 to the first base member 23 is substantially the same as the distance D2, which is the distance from the second carriage 44 to the second base member 25. The distances D1 and D2 may be readily adjusted by moving the first and second carriages 42, 44 such that D1 and D2 are equal or are not equal. When D1 is not equal to D2 the first and second gear box assemblies 50, 54 are offset relative to one another, such that the frame member 58 is caused to be tilted relative to the floor 100 (and relative to the first and second pedestals 22, 24). The tilt of the frame member 58 may be measured as an angle designated the B angle as shown in FIG. 2, which is a measure of the degrees from horizontal the frame member 58 is tilted. For example, the B angle is zero in FIG. 2, because D1 is equal to D2. The B angle increases as the frame member 58 is tilted. In FIG. 3 the B angle is greater as compared to the B angle in FIG. 2, because the frame member 58 is tilted in FIG. 3. Thus, the previously described A-axis about which the gearbox assemblies 50, 54 rotate is tilted when the first and second carriages 42, 44 move the first and second gearbox assemblies 50, 54 such that D1 and D2 are not equal. Hence, the frame member 58 may be horizontal with respect to the floor 100 (zero B angle), may be rotated about the A-axis, and may be tilted such that the A-axis is not horizontal relative to the floor 100, i.e., there is a measurable B angle. This provides for increased machine tooling flexibility.

FIG. 3 is a view showing the frame member 58 tilted relative to the floor 100, when D1 does not equal D2. It is pointed out the when the frame member 58 is tilted, the second pedestal 24 is moved in a direction toward the first pedestal 22 along the second pair of rails 34 in order to accommodate the decreased lateral distance between the first and second pedestals 22, 24, or gearbox 54 is moved perpendicular to the W-axis by the carriage 44 on the second pair of pedestal guides or rails 48.

In addition, the flexible fastening machine tool 20 has a C-frame 60 which may be used in, for example, the process of drilling holes in the workpiece 98 (shown in FIG. 5), or positioning and upsetting or inserting fasteners in a workpiece 98 in a fastening operation. The workpiece 98 is supported by the frame member 58, and may be readily attached and removed from the frame member 58. The C-frame 60 is positioned on the third pair of rails 34 and is capable of being moved along the third pair of rails 34 back and forth in the X-axis direction by a means for moving 40b. The means for moving 40b may include electric drive units, hydraulic drive units, pneumatic drive units, screw arrangements, and other means for moving. The C-frame 60 has an upper C-frame portion 64 from which extends a sub-frame 68. The sub-frame 68 supports a tooling head 70, and may support more than one tooling head 70. The tooling head 70 may include a drill, a ram for riveting operations, and other suitable tools. The tooling head 70 is for performing tooling operations on a workpiece 98 and the sub-frame 68 may include a cylinder or actuator for actuating the tooling head 70, and may include a motor for moving different tooling devices into position for performing other tooling operations on the workpiece. The C-frame 60 also has a lower frame portion 72, such that the lower frame portion 72 is disposed substantially vertically below the sub-frame 68. The lower frame portion 72 has a slide assembly 74 having a ram or anvil 76 that is mounted within a cylinder 78, and the ram 76 is actuated by a hydraulic or pneumatic cylinder or an electric actuator assembly 74. The ram or anvil 76 is used in combination with the tooling head 70 to accomplish tooling operations on the workpiece 98. Tooling heads for use in combination with C-frames are well known to those having ordinary skill in the art.

Thus, the C-frame 60 is capable of being moved along the third pair of rails 34 in the X-axis direction towards and away from either of the first and second pedestals 22, 24. The first pedestal 22 is capable of being moved along the first pair of rails 26 along the Y-axis toward and away from the C-frame 60. The second pedestal 24 is capable of being moved along the second pair of rails 28 in the Y-axis direction, and in addition, is capable of being moved in the X-axis direction along the third pair of rails 34. Thus, one of the advantages of the flexible fastening machine tool 20 is significantly increased versatility in that it is capable of accomplishing machining operations on a workpieces 98 that have significant dimensional differences. In addition, a plurality of frame members 58 having different lengths may be accommodated by the same flexible fastening machine tool 20, and this has the advantage of the elimination of a multiplicity of machine tools. In addition, because the different frame members 58 are usable with the same flexible fastening machine tool 20, the need for a heavy difficult to control work frame has been advantageously eliminated. Thus, the first and second pedestals 22, 24, the first and second gear box assemblies 50, 54, the foundations in the floor 100, may all be made of lighter materials as compared to the prior art. This advantageously decreases manufacturing costs, down time, and provides for superior versatility in that frame members 58 of different lengths L may be accommodated by the same flexible fastening machine tool 20.

Figure 1:
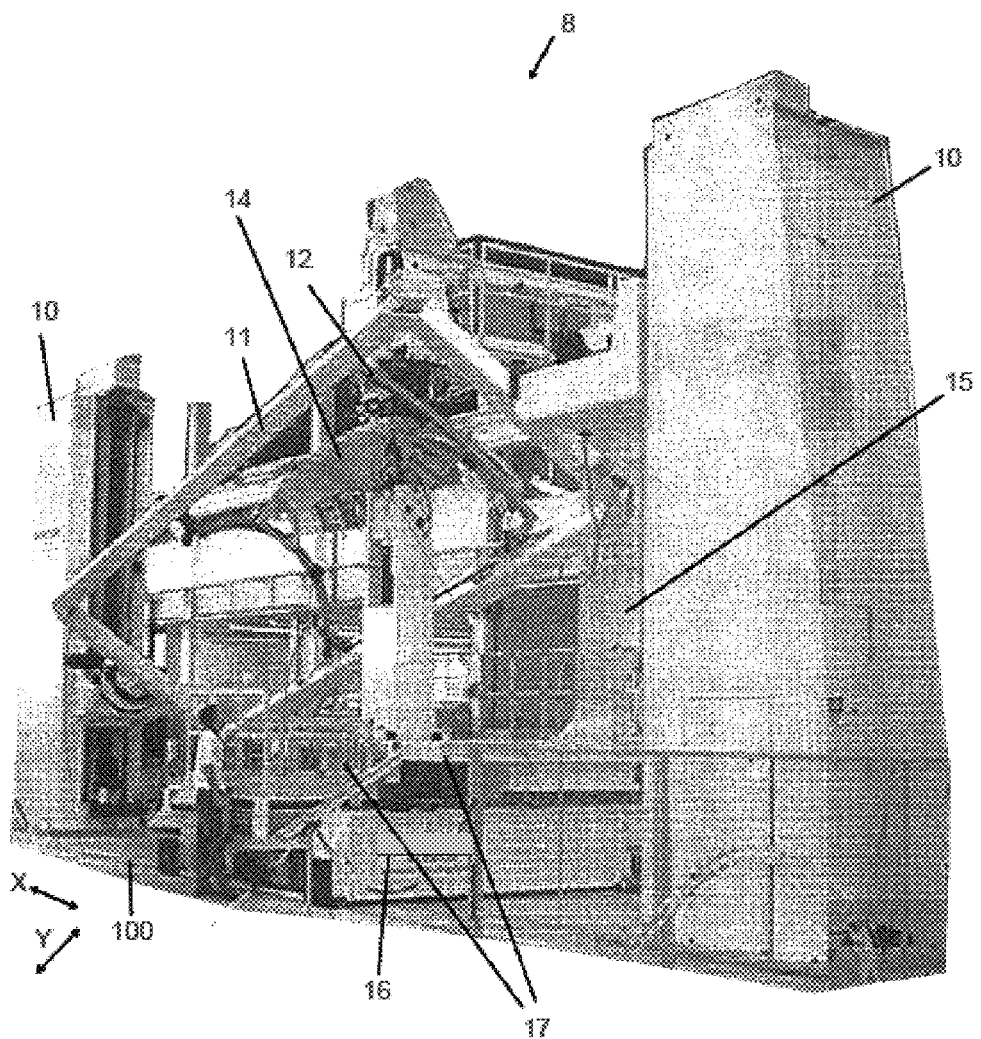
FIG. 1 is a perspective view of a prior art machine tool.

Another advantage is the elimination of the C-frame platforms 17 and carriage 16 (disclosed in the prior art shown in FIG. 1) from beneath the C-frame 15. The Y-axis movement has been relocated to the lighter first and second pedestals 22, 24. This reduces the overall height of the C-frame 60 and the first and second pedestals 22, 24 and allows the overall weight of the flexible fastening machine tool 20 to be more equally distributed on the floor 100, thereby further reducing the foundation requirements. Another advantage is the overall lowering of the flexible fastening machine tool 20 height. In the prior art, the maximum B angle was a function of the fixed length work frame and the differential travel in the Z and W axes on the pedestals 10. To increase the B angle in the prior art, the pedestals 10 and C-frame 15 had to increase in height. The new design embodied in the flexible fastening machine tool 20 advantageously allows use of a shorter frame member 58 to increase the B angle without increasing the height and weight of the system, thereby further reducing the foundation requirements, and maintenance and operation costs and safety and machine costs. Thus, another of the advantages of the present invention is that the need for multiple machine tools is advantageously eliminated. In other words, the flexible fastening machine tool 20 is capable of doing the work of a plurality of prior art machines. Another advantage is that the gear boxes 50, 54 do not need to be as massive as in the prior art, because the work frame 11 called for in the prior art machines has been eliminated. Another advantage is that the foundations that support the flexible fastening machine tool 20 do not need to be as thick and massive as compared to the foundations required for prior art machine tools, because the flexible fastening machine tool 20 is not as heavy as the prior art machine tools. Decreased foundation thickness advantageously results in a substantial decrease in costs associated with the flexible fastening machine tool 20. In addition, the flexible fastening machine tool 20 does not require the work frame 11 called for in the prior art machine tools and does not require counterweights that are as heavy as those used in prior art devices, and this advantageously reduces costs. Another advantage is eliminating the work frame called for in the prior art devices allows for greater access to the workpiece for fastening, etc. The work frames associated with the prior art could interfere with the lower ram assembly or upper head, or C-frame when rotated in various combinations of A and/or A and B angles. This results in the inaccessible fasteners having to be manually installed at a much greater cost and results in a lower quality finished work piece 14.

It will be appreciated by those skilled in the art that while the flexible fastening machine tool 20 has been described above in connection with particular embodiments and examples, the invention is not necessarily so limited, and other embodiments, examples, uses, and modifications and departures from the described embodiments, examples, and uses may be made. All of these embodiments are intended to be within the scope and spirit of the flexible fastening machine tool 20.

What is claimed:

1. A flexible fastening machine tool system, comprising:
    a first pedestal mounted on at least one first rail for movement in a Y-axis direction;
    a second pedestal facing the first pedestal and mounted on at least one second rail for movement in the Y-axis direction, the at least one second rail mounted on at least one third rail such that the second pedestal is also capable of being moved in an X-axis direction toward and away from the first pedestal;
    a first movable carriage mounted on the first pedestal;
    a second movable carriage mounted on the second pedestal; and,
    a frame member for holding a workpiece, the frame member supported by the first and second carriages;
    wherein the frame member is interchangeable with a second frame member, the second frame member having a different length than the frame member along the X-axis.

2. The flexible fastening machine tool system of claim 1, wherein the first movable carriage is capable of moving along at least one rail in a direction perpendicular to the X and Y axes.

3. The flexible fastening machine tool system of claim 1, wherein the second movable carriage is capable of moving along at least one rail in a direction perpendicular to the X and Y axes.

4. The flexible fastening machine tool system of claim 1, wherein the first and second movable carriages move independently toward and away from the at least one first and at least one second rail respectively.

5. The flexible fastening machine tool system of claim 1, further comprising a C-frame disposed in operative relation to the frame member.

6. The flexible fastening machine tool system of claim 1, further comprising a C-frame mounted on the at least one third rail.

7. The flexible fastening machine tool system of claim 1, further comprising a first gear box assembly mounted on the first carriage.

8. The flexible fastening machine tool system of claim 1, further comprising a second gear box assembly mounted on the second carriage.

9. The flexible fastening machine system tool of claim 1, wherein the at least one second rail is mounted on a rail base.

10. The flexible fastening machine tool system of claim 9, wherein the rail base is mounted on the at least one third rail.

11. The flexible fastening machine tool system of claim 1, further comprising a platform disposed between the at least one first rail and a support surface.

12. A flexible fastening machine tool system, comprising:
    a first pedestal mounted on at least one first rail for movement in a Y-axis direction;
    a second pedestal facing the first pedestal and mounted on at least one second rail for movement in the Y-axis direction, the at least one second rail mounted on at least one third rail such that the second pedestal is also capable of being moved in an X-axis direction toward and away from the first pedestal;
    a first movable carriage mounted on the first pedestal;
    a second movable carriage mounted on the second pedestal; and,
    a frame member for holding a workpiece, the frame member supported by the first and second carriages;
    a C-frame disposed adjacent to the frame member and capable of performing tooling operations on the workpiece; and,
    wherein the frame member is interchangeable with a second frame member, the second frame member having a different length than the frame member along the X-axis.

13. The flexible fastening machine tool system of claim 12, wherein the first movable carriage is capable of moving along at least one rail in a direction perpendicular to the X and Y axes.

14. The flexible fastening machine tool system of claim 12, wherein the second movable carriage is capable of moving along at least one rail in a direction perpendicular to the X and Y axes.

15. The flexible fastening machine tool system of claim 12, wherein the first and second movable carriages move independently toward and away from the at least one first and at least one second rail respectively.

16. A method of using a flexible fastening machine tool, comprising:
    providing a first pedestal mounted on at least one first rail for movement in a Y-axis direction;
    providing a second pedestal facing the first pedestal and mounted on at least one second rail for movement in the Y-axis direction, the at least one second rail mounted on at least one third rail such that the second pedestal is also capable of being moved in an X-axis direction toward and away from the first pedestal;
    providing a first movable carriage mounted on the first pedestal;
    providing a second movable carriage mounted on the second pedestal;
    providing a frame member supported by the first and second carriages;
    providing a C-frame disposed in operative relation to the frame member, the C-frame having at least one tool disposed thereon;
    holding a workpiece in the frame member;
    performing tooling operations on the workpiece; and,
    replacing the frame member supported by the first and second carriages with a second frame member supported by the first and second carriages, the second frame member having a different length than the frame member along the X-axis.

17. The method of claim 16, wherein the first movable carriage is capable of moving along at least one rail in a direction perpendicular to the X and Y axes.

18. The method of claim 16, wherein the second movable carriage is capable of moving along at least one rail in a direction perpendicular to the X and Y axes.

19. The method of claim 16, wherein the first and second movable carriages move independently toward and away from the at least one first and at least one second rail respectively.

20. The method of claim 16, wherein the C-frame is mounted on the at least one third rail.

* * * * *